US011445132B2

(12) United States Patent
Glasmacher

(10) Patent No.: US 11,445,132 B2
(45) Date of Patent: Sep. 13, 2022

(54) DEVICE AND METHOD FOR DETECTING OBJECTS

(71) Applicant: TARSIER GMBH, Nuremberg (DE)

(72) Inventor: Mathias Glasmacher, Reilingen (DE)

(73) Assignee: Tarsier GmbH, Nuremberg (DE)

( * ) Notice: Subject to any disclaimer, the term of this patent is extended or adjusted under 35 U.S.C. 154(b) by 249 days.

(21) Appl. No.: 16/858,793

(22) Filed: Apr. 27, 2020

(65) Prior Publication Data

US 2020/0344427 A1 Oct. 29, 2020

(30) Foreign Application Priority Data

Apr. 27, 2019 (DE) .............................. 102019003049

(51) Int. Cl.
*H04N 5/33* (2006.01)
*G06V 20/40* (2022.01)
*G06V 20/64* (2022.01)
(52) U.S. Cl.
CPC ............... *H04N 5/33* (2013.01); *G06V 20/46* (2022.01); *G06V 20/64* (2022.01)

(58) Field of Classification Search
CPC ................. A61N 5/0616; A61N 5/067; A61N 2005/0632; A61N 2005/0644; A61N 2005/0658; A61B 90/90
See application file for complete search history.

(56) References Cited

U.S. PATENT DOCUMENTS

| 10,009,554 | B1* | 6/2018 | Miao ..................... H04N 5/2351 |
| 2017/0039413 | A1* | 2/2017 | Nadler ............... H04N 5/23206 |
| 2017/0092138 | A1 | 3/2017 | Trundle et al. |
| 2017/0104939 | A1* | 4/2017 | Sun ........................ H04N 5/378 |
| 2019/0065850 | A1 | 2/2019 | Stryjewski et al. |

* cited by examiner

*Primary Examiner* — David P Porta
*Assistant Examiner* — Meenakshi S Sahu
(74) *Attorney, Agent, or Firm* — Laurence A. Greenberg; Werner H. Stemer; Ralph E. Locher

(57) ABSTRACT

In order to detect flying objects, a camera configuration is used for video monitoring of a monitoring space, and a control unit is used for controlling the camera configuration and evaluating the video frames recorded by the camera configuration. The camera configuration has an infrared illuminator for the monitoring space and at least one camera with an infrared image sensor. The infrared illuminator is preferably operated in a pulsed fashion synchronously with a measurement cycle of the camera.

17 Claims, 1 Drawing Sheet

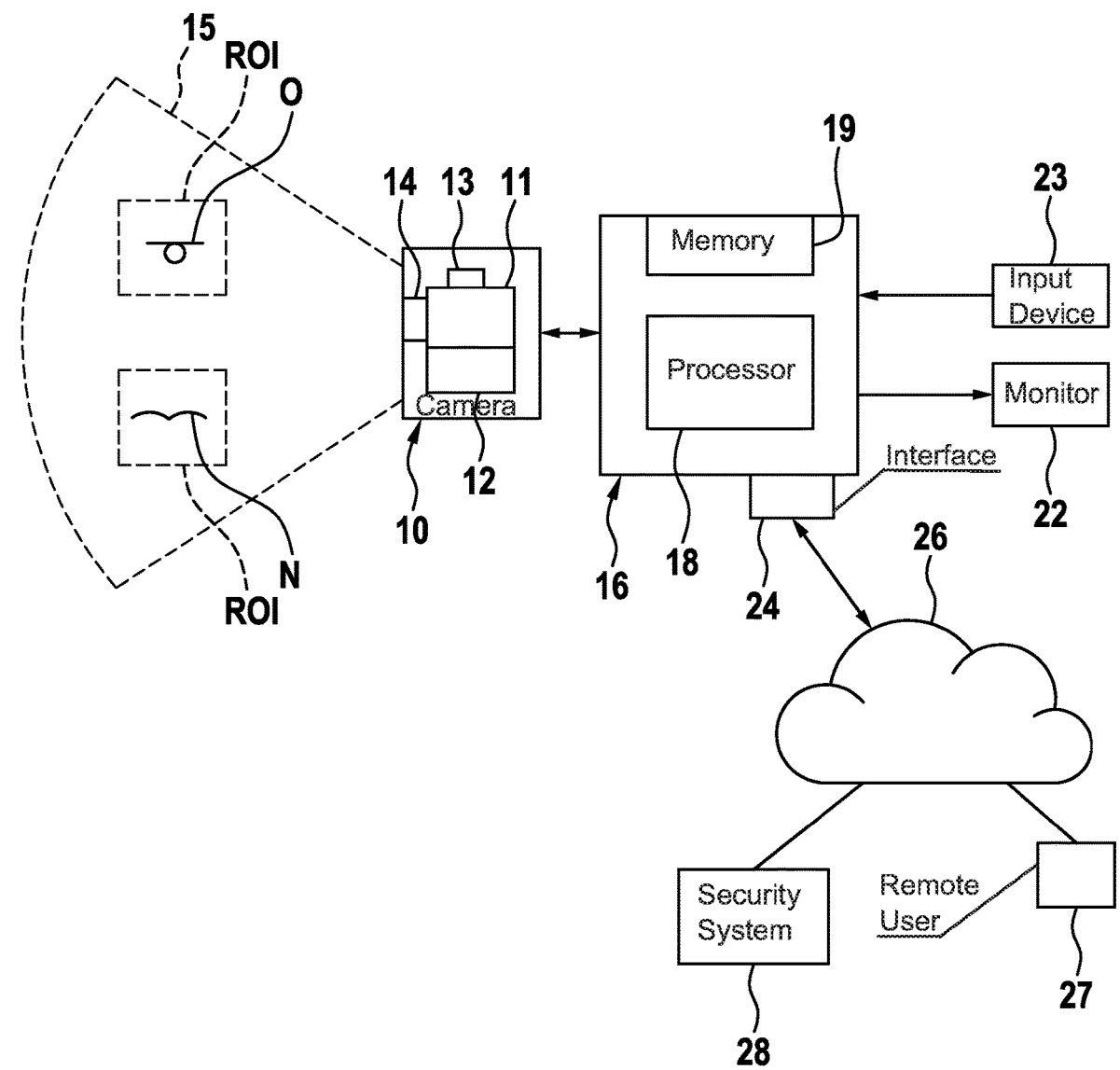

DEVICE AND METHOD FOR DETECTING OBJECTS

CROSS-REFERENCE TO RELATED APPLICATION

This application claims the priority, under 35 U.S.C. § 119, of German application DE 10 2019 003 049, filed Apr. 27, 2019; the prior application is herewith incorporated by reference in its entirety.

BACKGROUND OF THE INVENTION

Field of the Invention

The present invention relates to a device and to a method for detecting objects, in particular flying objects, in a monitoring space.

Unmanned flying objects (UAVs, Unmanned Aerial Vehicles), frequently also referred to as drones, are being used more and more, for example in order to reconnoitre or attack, or smuggle items into, secured locations such as prisons, airports, military installations, government buildings, etc. For example, it is happening ever more frequently that prohibited items, for example drugs, weapons or mobile telephones, are being transported over prison walls to prison inmates with the aid of drones. There is therefore a need for a system to protect against unallowed use of such flying objects.

BRIEF SUMMARY OF THE INVENTION

The object of the invention is to provide a solution for the detection of (flying) objects, with which objects in a monitoring space can reliably be detected and identified even in poor light conditions.

This object is achieved by the teaching of the independent claims. The dependent claims relate to particularly advantageous configurations and refinements of the invention.

The device according to the invention for detecting objects, in particular flying objects, contains a camera arrangement for video monitoring of a monitoring space and a control unit for controlling the camera arrangement and evaluating the video frames recorded by the camera arrangement. The invention is characterized in that the camera arrangement contains infrared illuminator for emitting infrared radiation into the monitoring space and at least one camera with an infrared image sensor.

Because of the infrared irradiation of the monitoring space, objects in the monitoring space can be detected and identified by an infrared-capable camera of the camera arrangement even in poor light conditions, for example at night, in fog or under heavy cloud cover.

The camera arrangement contains at least one camera with an infrared image sensor, i.e. one or more cameras with an infrared image sensor. Besides the at least one camera with an infrared image sensor, the camera arrangement may optionally also contain further cameras without an infrared image sensor. According to the invention, the camera arrangement contains the infrared illuminator for emitting infrared radiation into the monitoring space. In the scope of the present invention, this infrared illuminator is preferably an additional infrared emitter as a separate component of the infrared-capable camera; as an alternative or in addition, the infrared illuminator may also be integrated into the infrared-capable camera. The infrared radiation emitted by the infrared illuminator is preferably near infrared (NIR, 0.7 to 1.4 µm), shortwave infrared (SWIR, 1.4 to 3.0 µm), medium infrared (MWIR, 3.0 µm to 8 µm) or longwave infrared (LWIR, 8 to 15 µm).

The objects which may be recorded by the monitoring device according to the invention include—depending on the application—in particular unmanned flying objects (UAVs), helicopters, aeroplanes, birds and the like. By flying objects of interest in this context are detectable flying objects which—depending on the application—are relevant and therefore to be identified. The flying objects of interest include, in this context, in particular the unmanned flying objects (UAVs), without the invention being intended to be restricted to these flying objects. Furthermore, the monitoring device according to the invention may also be used to detect and identify other objects, for example persons or stationary objects.

In one configuration of the invention, the control unit is configured to operate the infrared illuminator in a pulsed fashion, timing of the infrared illuminator being preferably synchronous with a measurement cycle of the camera, i.e. it preferably has the same frequency and the same phase as the measurement cycle of the camera. Because of the pulsed operation, higher radiation powers can be achieved with a lower energy outlay on average, so that on the one hand higher brightness and higher ranges of the infrared radiation and therefore improved detection and identification of objects with an improved signal-to-noise ratio and in a larger region of space, and on the other hand an energy saving and lower thermal loads, may be achieved.

In the case of pulsed operation of the infrared illuminator, the control unit may preferably be further configured to operate the infrared illuminator with pulses of different radiation power, so that a distance of an object from the camera arrangement may be determined from an intensity difference of the measurement signals recorded by the camera as a result of the infrared pulses of different radiation powers. The different radiation powers of two successive pulses of the infrared radiation preferably have a ratio of about 2:1. In this way, without empirical comparative data, the control unit may carry out a distance estimation of a detected object with the aid of the greyscale ratios and greyscale amplitudes. As an alternative or in addition, the device may also be equipped with range sensors, for example laser rangefinders.

In the case of pulsed operation of the infrared illuminator, the control unit may preferably be further configured to operate the infrared illuminator with pulses of different radiation power, so that a movement of an object may be determined from an intensity difference of the measurement signals recorded by the camera as a result of the infrared pulses of different radiation powers. The different radiation powers of two successive pulses of the infrared radiation preferably have a ratio of about 2:1. In this way, the control unit may identify a movement of a detected object with the aid of the greyscale ratios.

In one configuration of the invention, the control unit is configured to operate the camera arrangement in a search mode in order to detect an object in the monitoring space and in an identification mode in order to identify an object detected in the observation space. In this configuration, the control unit is preferably furthermore configured to operate the infrared illuminator with a lower radiation power in the search mode than in the identification mode. Since evaluation of the measurement signals in the search mode is less complex and less critical than in the identification mode, for example the brightness of the infrared radiation, the resolution of the acquired video frames and the signal-to-noise ratio in the search mode may be somewhat inferior, so that the radiation power of the infrared illuminator may be reduced in the search mode in order to save energy.

For the purpose of this energy saving, the infrared illuminator may comprise a multiplicity of infrared light-emitting diodes, and the control unit may be configured for example to operate the infrared illuminator with only some of the infrared light-emitting diodes (for example switching off a light-emitting diode matrix by columns or by rows) and/or with dimmed infrared light-emitting diodes in the search mode. As an alternative or in addition, the control unit may be configured to operate the at least one camera and the infrared illuminator for synchronous scanning of the monitoring space in the search mode, and for illumination and detection of a subregion, containing a detected object, of the monitoring space in the identification mode. For example, scanning in the horizontal direction with a vertical light-emitting diode arrangement may be used for the infrared illuminator. Because of the significant energy saving in the search mode, the infrared illuminator may then be operated with more radiation power in the identification mode in order to achieve better signal evaluation, without entailing excessive energy consumption and/or excessive heating of the camera arrangement.

In another configuration of the invention, the camera arrangement contains at least one (preferably infrared-capable) camera, which works selectively in non-zoom operation or in zoom operation. The control unit is in this case preferably configured to operate the camera in non-zoom operation in the search mode and in zoom operation in the identification mode. In this way, multistage classification of (flying) objects detected in the monitoring space may be carried out, which allows reliable and precise identification of the detected (flying) objects with a relatively economical monitoring device.

The camera arrangement preferably comprises at least one (preferably infrared-capable) black-and-white camera. In comparison with a colour camera, a black-and-white camera offers better resolution and may thus improve the identification of the detected (flying) objects.

The camera arrangement preferably contains at least one (preferably infrared-capable) PTZ camera. PTZ camera allows lateral panning and tilting upward and downward and has a zoom function ("Pan-Tilt-Zoom").

Preferably, the camera arrangement contains at least one infrared-capable black-and-white PTZ camera.

In another configuration of the invention, the camera arrangement comprises at least one high-pass filter. By the use of a high-pass filter, the acquired video frames do not differ too greatly even in different light conditions (for example day and night), so that the evaluation of the video frames by the control unit may be simplified and improved.

In another configuration of the invention, the camera arrangement contains a brightness sensor, and the control unit is configured to operate the infrared illuminator only if a brightness in the monitoring space, detected by the brightness sensor, falls below a predetermined limit value. That is to say, the infrared illuminator is switched off when the light conditions are good enough that the camera can detect and identify the objects in the monitoring space even without illumination with infrared radiation, so that the energy consumption of the camera arrangement is reduced. The brightness sensor is preferably formed by the camera of the camera arrangement, although alternatively it may also be provided as a separate component.

In another configuration of the invention, the control unit is configured to operate the camera arrangement in order to record reference images. The control unit may then compare the video frames recorded by the camera arrangement with the previously acquired reference images, in order to detect and identify (flying) objects in the monitoring space. The acquisition of the reference images is preferably carried out dynamically (in order to identify movements in the monitoring space that are not based on objects of interest), for different ambient conditions (for example different light conditions and weather conditions) and/or with and without objects. The reference images are preferably stored in a memory of the control unit.

In another configuration of the invention, the infrared illuminator contains a plurality of radiation fields, the radiation intensities of the radiation fields decreasing in edge regions to neighbouring radiation fields. In this way, maximally homogeneous lighting of the monitoring space may be achieved despite the overlaps of the infrared radiation from different radiation fields, so that improved evaluation of the acquired video frames is possible.

In the method according to the invention for detecting objects, in particular flying objects, video frames of a monitoring space are recorded by a camera arrangement and evaluated by a control unit, the monitoring space being irradiated by infrared illumination and the video frames of the monitoring space being acquired by at least one camera with an infrared image sensor.

In respect of the advantages, preferred configurations and term explanations, reference is additionally made to the comments above relating to the monitoring device according to the invention.

In one configuration of the invention, the infrared illuminator is operated in a pulsed fashion synchronously with a measurement cycle of the camera.

Preferably, the infrared illuminator is operated with pulses of different radiation power, and a distance of an object from the camera arrangement and/or a movement of an object are/is determined from an intensity difference of the measurement signals recorded by the camera as a result of the infrared pulses of different radiation powers.

In one configuration of the invention, the camera arrangement is operated in a search mode in order to detect an object in the monitoring space and in an identification mode in order to identify an object detected in the monitoring space, the infrared illuminator preferably being operated with a lower radiation power in the search mode than in the identification mode. For example, the infrared illuminator contains a multiplicity of infrared light-emitting diodes and is operated with only some of the infrared light-emitting diodes and/or with dimmed infrared light-emitting diodes in the search mode. Furthermore, the at least one camera and the infrared illuminator may be operated for synchronous scanning of the monitoring space in the search mode, and for illumination and detection of a subregion, containing a detected object, of the monitoring space in the identification mode.

In one configuration of the invention, the at least one camera is operated in non-zoom operation in the search mode and in zoom operation in the identification mode.

In another configuration of the invention, a brightness in the monitoring space is detected (for example by the at least one camera), and the infrared illuminator is operated only if the brightness detected in the monitoring space falls below a predetermined limit value.

In another configuration of the invention, reference images are recorded by the camera arrangement and stored in a memory of the control unit, in order to be used during the evaluation of the video frames recorded by the camera arrangement.

The features above, and other features and advantages of the invention, will be better understandable from the following description of preferred nonrestrictive exemplary embodiments with reference to the appended drawing, in which the Other features which are considered as characteristic for the invention are set forth in the appended claims.

Although the invention is illustrated and described herein as embodied in a device and a method for detecting objects, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE is a schematic illustration of a structure of a monitoring device according to one exemplary embodiment of the invention.

DETAILED DESCRIPTION OF THE INVENTION

Referring now to the single FIGURE of the drawing in detail, there is shown a monitoring device that contains a camera arrangement 10 for video monitoring of a monitoring space 15, in which flying objects of interest O, for example unmanned flying objects (UAVs), or drones, and flying objects not of interest N, for example birds or aeroplanes, may appear.

The camera arrangement 10 contains in particular an infrared-capable camera 11, i.e. a camera with an infrared image sensor, and an infrared illuminator 12. The camera 11 is preferably also configured as a PTZ camera and as a black-and-white camera. Optionally, the camera 11 may also be provided with a gated viewing functionality. The infrared illuminator 12 is for example an infrared emitter as a component separate from the camera 11, which emits near infrared (NIR), shortwave infrared (SWIR), medium infrared (MWIR) or longwave infrared (LWIR). The infrared illuminator 12 usually contains plurality a plurality of LED groups outputting radiation fields. In this exemplary embodiment, the infrared illuminator 12 is configured in such a way that the radiation intensities of the radiation fields decrease in edge regions to neighbouring radiation fields, so that maximally homogeneous lighting of the monitoring space 15 may be achieved despite the overlaps of the infrared radiation from neighbouring radiation fields.

In one variant of the exemplary embodiment of FIG. 1, the camera arrangement 10 may also contain a plurality of cameras 11 and/or a plurality of infrared illuminators 12, which may be driven independently of one another in order to scan, zoom or emit independently of one another. In another variant of the exemplary embodiment of FIG. 1, in addition to the one or more PTZ cameras 11, the camera arrangement 10 may comprise one or more static cameras, which may optionally be equipped with fisheye objectives, in order to be able to cover larger fields of view.

In this exemplary embodiment, the camera arrangement 10 furthermore comprises a high-pass filter 14 in order to filter out shorter-wave light (for example daylight, artificial light from streetlamps, etc.). Furthermore, the camera arrangement 10 optionally contains a brightness sensor 13, which may for example be formed by the camera 11 itself or a separate sensor, in order to activate the infrared illuminator 12 only in poor light conditions.

As represented in FIG. 1, the camera arrangement 10 is connected to a control unit 16, which in particular contains a processor 18 and a memory 19. The control unit 16 controls the camera arrangement 10, in particular its camera 11 and the infrared illuminator 12, and evaluates the video frames acquired by the camera 11, preferably by use of neural networks. The video frames recorded by the camera 11 are stored in the memory 19. Optionally, the memory 19 may also store reference images acquired by the camera 11 and further reference image data, with which the video frames recorded by the camera 11 are compared by the processor 18 in order to detect and identify (flying) objects N, O in the monitoring space 15. The acquisition of the reference images is preferably carried out dynamically, in order to identify movements in the monitoring space 15 that are not based on objects of interest O (for example plants moved by wind, etc.), for different ambient conditions (for example different light conditions and weather conditions) and with and without objects. The reference images may also be used for training the neural networks by means of deep learning.

The control unit 16 is connected to a monitor 22, in order to show a user of the monitoring device the video frames recorded by the camera 11 and the evaluation results of the control unit 16. The control unit 16 is furthermore connected to an input device 23, by means of which a user of the monitoring device may, for example, input control instructions.

In the exemplary embodiment of FIG. 1, the control unit 16 furthermore has an interface 24, by means of which it may be coupled to a network 26. Via the network 26 (for example a radio network or the Internet), the control unit 16 may be connected to a remote user 27 in order to send the evaluation results to the remote user 27 and/or in order to receive control instructions from the remote user 27. The control unit 16 may also send the evaluation results via the network 26 to an existing security system 28 at a secured location (for example a prison, airport, military installation, government building, etc.).

The control unit 16, or its processor 18, and the camera arrangement 10 are configured in such a way that the infrared illuminator 12 is operated in a pulsed fashion, the timing of the infrared illuminator 12 being synchronous with the measurement cycle of the camera 11, i.e. it has the same frequency and the same phase as the measurement cycle of the camera 11. Furthermore, the control unit 16, or its processor 18, and the camera arrangement 10 are configured in such a way that the camera arrangement 10 is operated in a search mode in order to detect an object N, O in the monitoring space 15 and in an identification mode in order to identify an object N, O detected in the observation space 15.

In the search mode of the camera arrangement 10, the infrared illuminator 12 is to be operated with a lower radiation power than in the identification mode. Since the evaluation of the measurement signals in the search mode is less complex and less critical than in the identification mode, for example the brightness of the infrared radiation, the resolution of the acquired video frames and the signal-tonoise ratio in the search mode may be somewhat inferior, so that the radiation power of the infrared illuminator 12 may be reduced in the search mode in order to save energy. For the purpose of this energy saving, the infrared illuminator 12 may for example be operated with only some of the infrared light-emitting diodes (for example switching off a light-emitting diode matrix by columns or by rows) and/or with dimmed infrared light-emitting diodes in the search mode. As an alternative or in addition, the camera 11 and the infrared illuminator 12 may be operated for synchronous scanning of the monitoring space 15 in the search mode, and for illumination and detection of a subregion ROI (Region of Interest), containing a detected object N, O, of the monitoring space 15 in the identification mode. For example, scanning in the horizontal direction with a vertical light-emitting diode arrangement may be used for the infrared illuminator 12.

Furthermore, the PTZ camera 11 is operated in non-zoom operation in the search mode and in zoom operation in the identification mode. In this way, multistage classification of (flying) objects N, O detected in the monitoring space 15 may be carried out, during which, for example, whether an object detected by the camera 11 is an object of interest O or an object not of interest N is initially detected, and then in the case of an object of interest O the recorded object is to be identified precisely in the next evaluation stage.

The use of pulsed operation of the infrared illuminator 12 allows further types of operation and further evaluations. For instance, the infrared illuminator 12 may, in particular, be operated with pulses of different radiation power in the identification mode, so that the processor 18 can estimate a distance of the detected object O from the camera arrangement 10 from the greyscale ratios and greyscale amplitudes of the measurement signals recorded by the camera 11 as a result of the infrared pulses of different radiation powers. The different radiation powers of two successive pulses of the infrared radiation preferably have a ratio of about 2:1. In a similar way, the processor 18 may determine a movement of an object O from an intensity difference of the measurement signals recorded by the camera 11 as a result of the infrared pulses of different radiation powers.

The pulsed operation of the infrared illuminator 12 furthermore has the advantage that the infrared illuminator 12 is operated only temporarily with a high radiation power. As a result of this, the average energy consumption of the infrared illuminator 12 may be kept relatively low. Furthermore, large generation of heat takes place only temporarily, so that the thermal load may be kept low overall.

LIST OF REFERENCES 10 camera arrangement
11 infrared camera
12 infrared illuminator
13 brightness sensor
14 bandpass filter
15 monitoring space
16 control unit
18 processor
19 memory
22 monitor
23 input device
24 communication interface
26 network
27 remote user
28 safety system
N (flying) object not of interest
O (flying) object of interest
ROI region of interest

The invention claimed is:

1. A device for detecting objects, the device comprising:
a camera configuration for video monitoring a monitoring space, said camera configuration having an infrared illuminator emitting infrared radiation into the monitoring space and at least one camera with an infrared image sensor; and
a controller for controlling said camera configuration and evaluating video frames recorded by said camera configuration, said controller configured to operate said infrared illuminator in a pulsed fashion, and a timing of said infrared illuminator being synchronous with a measurement cycle of said at least one camera, wherein said controller is configured to operate said infrared illuminator with infrared pulses of different radiation power, and to determine a distance of an object from said camera configuration and/or a movement of the object from an intensity difference of measurement signals recorded by said at least one camera as a result of the infrared pulses of different radiation powers.

2. The device according to claim 1, wherein:
said controller is configured to operate said camera configuration in a search mode in order to detect an object in the monitoring space and in an identification mode in order to identify the object detected in the monitoring space; and
said controller is furthermore configured to operate said infrared illuminator with a lower radiation power in the search mode than in the identification mode.

3. The device according to claim 2, wherein:
said infrared illuminator contains a plurality of infrared light-emitting diodes; and
said controller is configured to operate said infrared illuminator with only some of said infrared light-emitting diodes and/or with dimmed said infrared light-emitting diodes in the search mode.

4. The device according to claim 2, wherein said controller is configured to operate said at least one camera and said infrared illuminator for synchronous scanning of the monitoring space in the search mode, and for illumination and detection of a subregion, containing a detected object, of the monitoring space in the identification mode.

5. The device according to claim 2, wherein:
said camera configuration having said at least one camera, which works selectively in a non-zoom operation or in a zoom operation; and
said controller is configured to operate said at least one camera in the non-zoom operation in the search mode and in the zoom operation in the identification mode.

6. The device according to claim 1, wherein said camera configuration has at least one black-and-white camera.

7. The device according to claim 1, wherein said camera configuration has at least one pan-tilt-zoom camera.

8. The device according to claim 1, wherein said camera configuration has at least one high-pass filter.

9. The device according to claim 1, wherein:
said camera configuration has a brightness sensor; and
said controller is configured to operate said infrared illuminator only if a brightness in the monitoring space, detected by said brightness sensor, falls below a predetermined limit value.

10. The device according to claim 1, wherein said infrared illuminator outputs a plurality of radiation fields, radiation intensities of the radiation fields decreasing in edge regions to neighbouring radiation fields.

11. A method for detecting objects, which comprises the steps of:
  recording video frames of a monitoring space by a camera configuration and evaluated by a controller;
  irradiating the monitoring space by means of an infrared illuminator and the video frames of the monitoring space are acquired by means of at least one camera with an infrared image sensor;
  operating the infrared illuminator in a pulsed fashion synchronously with a measurement cycle of the at least one camera;
  operating the infrared illuminator with infrared pulses of different radiation power; and
  determining a distance of an object from the camera configuration and/or a movement of the object from an intensity difference of measurement signals recorded by the at least one camera as a result of the infrared pulses of different radiation powers.

12. The method according to claim 11, which further comprises:
  operating the camera configuration in a search mode in order to detect an object in the monitoring space and in an identification mode in order to identify the object detected in the monitoring space; and
  operating the infrared illuminator with a lower radiation power in the search mode than in the identification mode.

13. The method according to claim 12, which further comprises:
  forming the infrared illuminator with a plurality of infrared light-emitting diodes; and
  operating the infrared illuminator with only some of the infrared light-emitting diodes and/or with dimmed said infrared light-emitting diodes in the search mode.

14. The method according to claim 12, which further comprises operating the at least one camera and the infrared illuminator for synchronous scanning of the monitoring space in the search mode, and for illumination and detection of a subregion, containing a detected object, of the monitoring space in the identification mode.

15. The method according to claim 12, which further comprises operating the at least one camera in a non-zoom operation in the search mode and in a zoom operation in the identification mode.

16. The method according to claim 11, which further comprises:
  detecting a brightness in the monitoring space; and
  operating the infrared illuminator only if the brightness detected in the monitoring space falls below a predetermined limit value.

17. The method according to claim 11, which further comprises recording reference images by means of the camera configuration and storing the reference images in a memory of the controller.

* * * * *